(12) United States Patent
Nii et al.

(10) Patent No.: US 7,251,891 B2
(45) Date of Patent: Aug. 7, 2007

(54) PRODUCTION METHOD FOR SINTERED BEARING MEMBER, FLUID DYNAMIC PRESSURE BEARING DEVICE, AND SPINDLE MOTOR

(75) Inventors: Katsutoshi Nii, Hitachi (JP); Shunichi Togashi, Matsudo (JP); Tadashi Akahori, Nagano (JP)

(73) Assignees: Hitachi Powdered Metals Co., Ltd., Chiba (JP); Minebea Co., Ltd., Nagano (JP)

( * ) Notice: Subject to any disclaimer, the term of this patent is extended or adjusted under 35 U.S.C. 154(b) by 158 days.

(21) Appl. No.: 11/137,134

(22) Filed: May 24, 2005

(65) Prior Publication Data

US 2005/0259898 A1    Nov. 24, 2005

(51) Int. Cl.
*B21K 1/10* (2006.01)

(52) U.S. Cl. .............................. 29/898.02; 29/898.045; 384/279

(58) Field of Classification Search ............. 29/898.02, 29/898.04, 898.054, 898.045; 384/279, 902
See application file for complete search history.

(56) References Cited

FOREIGN PATENT DOCUMENTS

| JP | H07-216411 A | 8/1995 |
| JP | H11-062948 A | 3/1999 |
| JP | 2002-333023 A | 11/2002 |

*Primary Examiner*—Lenard A. Footland
(74) *Attorney, Agent, or Firm*—Brinks Hofer Gilson & Lione

(57) ABSTRACT

A production method for sintered bearing member comprises: compacting a metal powder into a green compact, sintering the green compact into a sintered compact; impregnating a resin solvent into the sintered compact, and removing the resin solvent adhering to a surface of the sintered compact, thereby exposing a matrix as sintered on a surface of the sintered compact. Pores existing in portions other than the surface are sealed with the resin.

6 Claims, 6 Drawing Sheets

PRODUCTION METHOD FOR SINTERED BEARING MEMBER, FLUID DYNAMIC PRESSURE BEARING DEVICE, AND SPINDLE MOTOR

BACKGROUND OF THE INVENTION

1. Field of the Invention

The present invention relates to production methods for sintered bearing members, fluid dynamic pressure bearing devices, and spindle motors, and in particular relates to production techniques for sintered bearings which are used in spindle motors rotating with high precision for information devices.

Bearing devices using sintered bearing members have been used for spindle motors installed in optical disk devices in the field of information devices and for spindle motors used for polygonal mirrors installed in laser printers, and the like. Recently, these bearing devices have been also used for spindle motors installed in magnetic disk devices (hard disk drives). Fluid dynamic pressure bearing devices are used for spindle motors installed in magnetic disk devices as the bearing devices, and are required to have higher levels of performance such as high precision rotation, low noise, shock resistant, and low bearing torque loss even in the case of using sintered bearings. Therefore, several techniques have been researched for sintered bearing members to efficiently generate dynamic pressure.

The following techniques regarding the fluid dynamic pressure bearing devices have been proposed. For example, Japanese Patent Application Laid Open No. 7-216411, in the Abstract, proposes a technique to reduce friction coefficient and improve sliding performance, in which pores of at least a sliding surface of a sliding member is sealed by an impregnant to reduce the frictional resistance to sliding, thereby improving the frictional performance of the sliding member. Japanese Patent Application Laid Open No. 11-62948 proposes a technique to reduce production cost and ensure high precision rotation, in which a bearing surface facing an outer surface of a shaft is formed on an inner surface of a bearing body made from a sintered alloy, and is formed with dynamic pressure grooves inclined toward the axial direction of the bearing body, whereby the shaft is supported in a floating condition by air dynamic pressure generated by relative rotation of the shaft and the bearing body.

Japanese Patent Application Laid Open No. 2002-333023 proposes a technique to produce sintered sliding bearings with few processes, high quality, and stable yield performance, in which a resin is impregnated into pores of a sintered body and hardened therein; the sintered body is inserted into a die and compressed to reduce or close by plastic working the clearance formed between the pore and the resin due to shrinking during hardening of the resin.

Conventional fluid dynamic pressure bearings obtained by the techniques in the above proposals can ensure precise high speed rotation and low noise compared to ball bearings. Furthermore, the bearings can support large loads by suitable design and forming of the dynamic pressure grooves on the bearing surface. The dynamic pressure grooves on the bearing surface are formed in a sintered bearing member by plastic working. The sintered bearing member is produced by compacting a metal powder and sintering a green compact, and is a porous material usually having about 20% porosity, whereby lubricating oil is impregnated into pores, and the bearing member is used in several kinds of motors. The fluid dynamic pressure bearing device used for spindle motors which is required to have precision rotation as mentioned above is formed with dynamic pressure grooves to generate dynamic pressure on a bearing surface, and a member rotating relative thereto is supported by the dynamic pressure.

An ordinary sintered bearing member made of a porous material has a disadvantage that the dynamic pressure generated on a bearing surface leaks through pores, thereby decreasing load supporting capacity. As means for preventing leakage of the dynamic pressure, it has been known to impregnate a resin into pores and seal in a production process of the sintered bearing member. By such a treatment, decrease of the dynamic pressure generated on the bearing surface is avoided and the rotating member can rotate with high precision.

When the dynamic pressure grooves are formed on the bearing surface, for example, in a case of a sintered bearing member having multiple circular arc grooves, such as three circular arc grooves shown in FIG. 3, a pin having protrusions corresponding to the three circular arc grooves is inserted into an inner peripheral surface of a ring-shaped sintered material into which a resin was impregnated, and the pin is extracted therefrom, whereby the shape of the three circular arc grooves is transferred to the inner peripheral surface of the sintered material. For example, in a case of a sintered bearing member having herringbone grooves shown in FIG. 4, a pin having protrusions corresponding to the herringbone grooves is inserted into an inner peripheral surface of a ring-shaped sintered material into which a resin was impregnated, and the outer peripheral surface of the sintered material is compressed to abut the inner peripheral surface to the pin, whereby the shape of the herringbone grooves is transferred to the inner peripheral surface of the sintered material.

When the three circular arc grooves or the herringbone grooves are repeatedly formed by the above-mentioned plastic working in the ring-shaped sintered material into which a resin was impregnated, the resin impregnated into the sintered material may adhere to the surface of the pin which forms the dynamic pressure grooves. If the resin adheres to the surface of the pin which forms the dynamic pressure grooves, the shape of the dynamic pressure grooves is not precisely transferred to the inner peripheral surface of the sintered material. Furthermore, scratches may be formed on the inner peripheral surface of the sintered material when the pin is extracted during the forming of the three circular arc grooves in the sintered material, and the scratches may result in leakage of dynamic pressure.

SUMMARY OF THE INVENTION

Therefore, objects of the present invention are to provide a production method for a sintered bearing member, a fluid dynamic pressure bearing device, and a spindle motor in which the shape of the dynamic pressure grooves can be precisely transferred to the inner peripheral surface of the sintered material; formation of scratches can be avoided when the pin is extracted in producing the sintered material having the three circular arc grooves, and leakage of the dynamic pressure can be avoided, thereby being suitable for information devices, such as magnetic disk devices, with high reliability.

The present invention provides a production method for a sintered bearing member, the method comprising: compacting a metal powder into a green compact; sintering the green compact into a sintered compact; impregnating a water soluble resin solvent into the sintered compact; and removing the resin solvent adhering to a surface of the sintered compact, thereby exposing a matrix as sintered on a surface of the sintered compact. Pores existing in portions other than the surface are sealed with the resin.

The present invention further provides a fluid dynamic pressure bearing device having a radial sintered bearing member, the sintered bearing member being produced by steps comprising: compacting a metal powder into a ring-shaped green compact; sintering the green compact into a sintered compact; impregnating a water soluble resin solvent into the sintered compact; and removing the resin solvent adhering to a surface of the sintered compact, thereby exposing a matrix as sintered on a surface of the sintered compact. Pores existing in portions other than the surface are sealed with the resin; and dynamic pressure grooves are formed on at least an inner peripheral surface or an end surface of the sintered compact.

The present invention further provides a fluid dynamic pressure bearing device having a thrust sintered bearing member, the sintered bearing member being produced by steps comprising: compacting a metal powder into a ring-shaped green compact; sintering the green compact into a sintered compact; impregnating a water soluble resin solvent into the sintered compact; and removing the resin solvent adhering to a surface of the sintered compact, thereby exposing a matrix as sintered on a surface of the sintered compact. Pores existing in portions other than the surface are sealed with the resin; and dynamic pressure grooves are formed on an end surface of the sintered compact.

The present invention further provides a spindle motor comprising the above fluid dynamic pressure bearing device having the radial sintered bearing member or the thrust sintered bearing member, whereby the shape of the dynamic pressure grooves can be precisely transferred to a sliding surface, formation of scratches can be avoided when a pin is extracted in the production of a sintered bearing having three circular arc grooves, and leakage of the dynamic pressure can be avoided.

In the production method of the present invention, for example, a sintered material having pores is dipped in water soluble resin solvent such as a resin solvent containing methacrylate ester monomer as a main component. Thereby the resin solvent is impregnated into pores by such a treatment. The resin solvent is more easily impregnated into the pores and seals them if an inside of a container in which the resin solvent and the sintered material are contained is evacuated, whereby air in the pores of the sintered material is removed, and then returned to atmospheric pressure. That is, the pores of the sintered material change from a low-pressure condition to an atmospheric pressure condition, and the resin solvent is impregnated into the pores. When returning to the atmospheric pressure condition, the resin solvent adheres to the entire surface of the sintered compact. Therefore, water is poured or sprayed on the sintered compact, and the surface of the sintered compact is washed and the resin solvent adhering to the surface is removed.

In order to improve the shape and dimensional accuracy of the dynamic pressure grooves in producing a sintered bearing and to prevent leakage of the dynamic pressure, the resin solvent in the area from the surface of the sintered compact to a depth of approximately 0.1 to 0.2 mm is preferably removed by the washing. The resin solvent adhering to the surface of the sintered compact can be removed from the surface to an arbitrary depth by controlling the time for providing water. The sintered compact may be heated to a temperature of 80 to 90° C., thereby hardening the resin in the pores after removing the resin solvent adhering to the surface of the sintered compact.

In the production method of the invention, since the resin solvent which existed in the vicinity of the surface is removed and the working surface is a porous sintered material surface, the shape of the dynamic pressure grooves can be precisely transferred to the surface of the sintered compact. Furthermore, since the working surface is porous, the resin does not adhere to forming tools such as pins, scratches are not formed on the inner peripheral surface of the sintered compact when the pin is extracted from the sintered compact and the dimension of the sintered bearing member obtained after forming the dynamic pressure grooves can be precise. The resin solvent inside of the sintered compact is remained and hardened, thereby the pores of the sintered compact are sealed and leakage of dynamic pressure can be avoided.

Thus, in the fluid dynamic pressure bearing device having the sintered bearing member obtained by the production method of the invention can support high loads, whereby a shaft can smoothly rotate with high precision. Therefore, when the fluid dynamic pressure bearing device of the invention is used in spindle motors used for magnetic disk devices, optical disk devices, and laser printers, and the like, precision rotation is obtained, whereby high packing density of information devices and high speed and high accuracy of digital copy machines can be obtained.

DESCRIPTION OF THE PREFERRED EMBODIMENTS

Preferred embodiments of a fluid dynamic pressure bearing device, in which the invention is applied to a spindle motor used for a magnetic disk device, will be explained hereinafter.

Figure 1A:
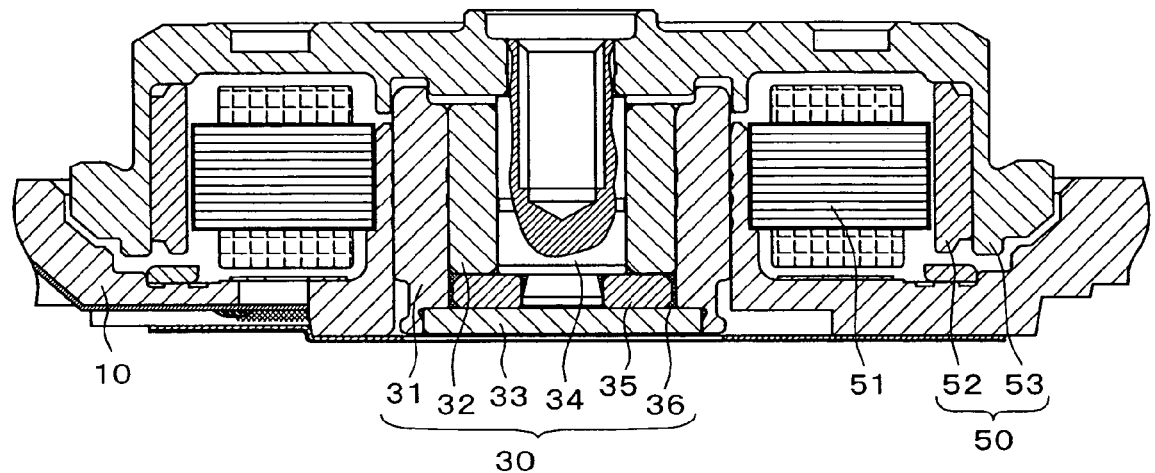
FIGS. 1A and 1B are side cross-sectional views showing different examples of a spindle motor used for a magnetic disk device.
Figure 1B:
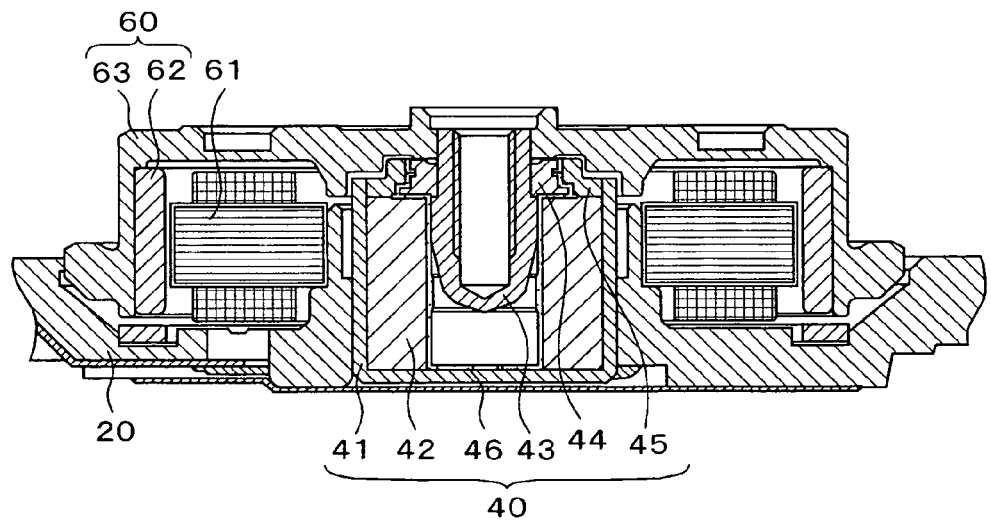

FIGS. 1A and 1B show a cross section of spindle motors used for a magnetic disk device. These spindle motors comprises motor cases 10 and 20, fluid dynamic pressure bearing devices 30 and 40 disposed inside the motor cases 10 and 20, rotors 50 and 60 rotatably supported by the fluid dynamic pressure bearing devices 30 and 40.

In the fluid dynamic pressure bearing device 30 shown in FIG. 1A, a sintered bearing member 32 having dynamic pressure grooves is press fitted into or adhered to the inner peripheral surface of a cylindrical case 31. The lower end of the inner peripheral surface of the case 31 is sealed by an end plate 33 having dynamic pressure grooves, which functions as a thrust bearing. A rotating shaft 34 is inserted and supported by the sintered bearing member 32. A thrust washer 35 is closely fitted around the shaft 34. Lubricating oil 36 is provided in the clearances formed by the elements 31 to 35. The rotor 50 comprises motor magnets 52 facing stator core 51 and a hub 53 to which a disk is mounted, and the rotor 50 rotates when the stator core 51 is excited.

In the fluid dynamic pressure bearing device 40 shown in FIG. 1B, a sintered bearing member 42 having dynamic pressure grooves is press fitted into or adhered to the inner peripheral surface of a cup-shaped member 41. A rotating shaft 43 is inserted and supported by the sintered bearing member 42. A ring 44 is closely fitted around the shaft 43 and faces the upper end surface of the sintered bearing member 42. A bearing ring 45 is closely fitted into the inner peripheral surface of the cup-shaped member 41. The lower end surface of the ring 44 facing the upper end surface of the sintered bearing member 42 is formed with dynamic pressure grooves so as to function as a thrust bearing. Lubricating oil 46 is provided in the clearances formed by the elements 42 to 45. The rotor 60 comprises motor magnets 62 facing stator core 61 and a hub 63 to which a disk is mounted, and the rotor 60 rotates when the stator core 61 is excited.

Figure 2:
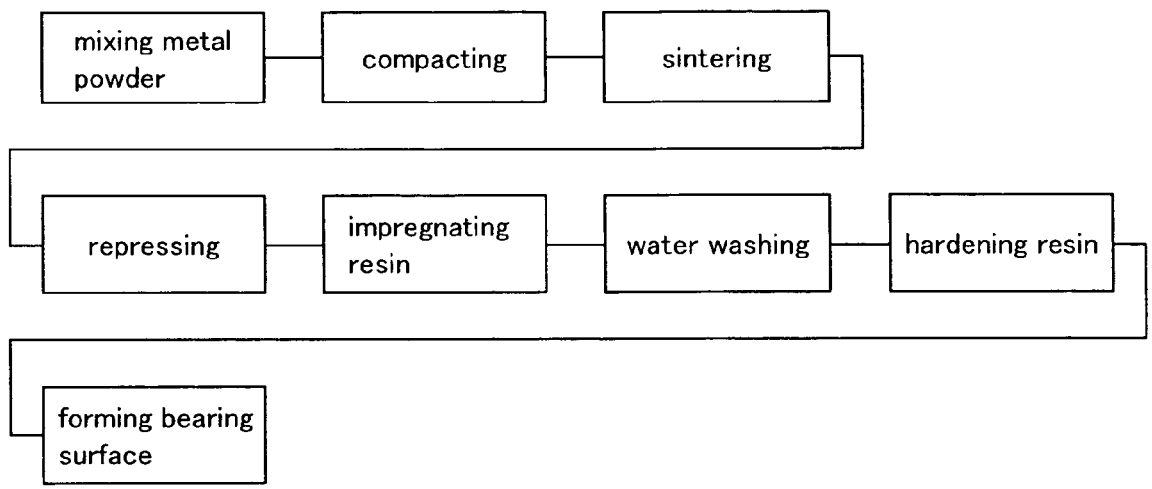
FIG. 2 shows a production process for a sintered bearing member 32 and 42 shown in FIGS. 1A and 1B.

FIG. 2 shows a production process for sintered bearing members 32 and 42 shown in FIGS. 1A and 1B. In the first process for producing the bearing members 32 and 42, a raw material of a metal powder is mixed and compacted at ordinary temperature. The metal green compact is then sintered at a high temperature. The sintered compact is porous and the porosity thereof may be about 20%. The sintered compact may then be repressed. This repressing (sizing) is optionally performed to improve the outer and inner diameter precision, and the density of the sintered compact is simultaneously adjusted in this repressing. The repressing can be omitted in the production process.

The sintered compact is dipped into a water soluble resin solvent, for example, resin solvent containing methacrylate ester monomer as a main component after sintering or repressing. Then, air pressure in the pores of the sintered compact is reduced to the required vacuum level, and after maintaining the vacuum level for a predetermined time, the pressure is returned to atmospheric pressure. The resin solvent is impregnated into pores in the sintered compact by returning the pressure to atmospheric pressure. Such an impregnation process is a preferable example of the invention. Impregnation of the resin solvent can be performed in a compressed condition.

After impregnation of the resin solvent into the sintered compact, water stream is sprayed on the sintered compact, whereby the resin solvent adhering to the surface of the sintered compact is removed. The amount of the resin solvent removed from the surface layer of the sintered compact corresponds to the time for providing the water stream. According to practical tests, the duration of providing the water stream is a few minutes to remove the resin solvent existing in the area from the surface of the sintered compact to a depth of about 0.1 mm. After removing resin solvent on the surface of the sintered compact, the resin inside of the sintered compact is hardened by heating the sintered compact to a temperature of 80 to 90° C. The surface layer of the sintered compact from which the resin solvent has been removed exhibits a matrix as sintered before the impregnation of the resin solvent. The sintered compact is then subjected to plastic working to form dynamic pressure grooves on the bearing surface, and the sintered bearing members 32 and 42 shown in FIGS. 1A and 1B are produced.

Figure 3:
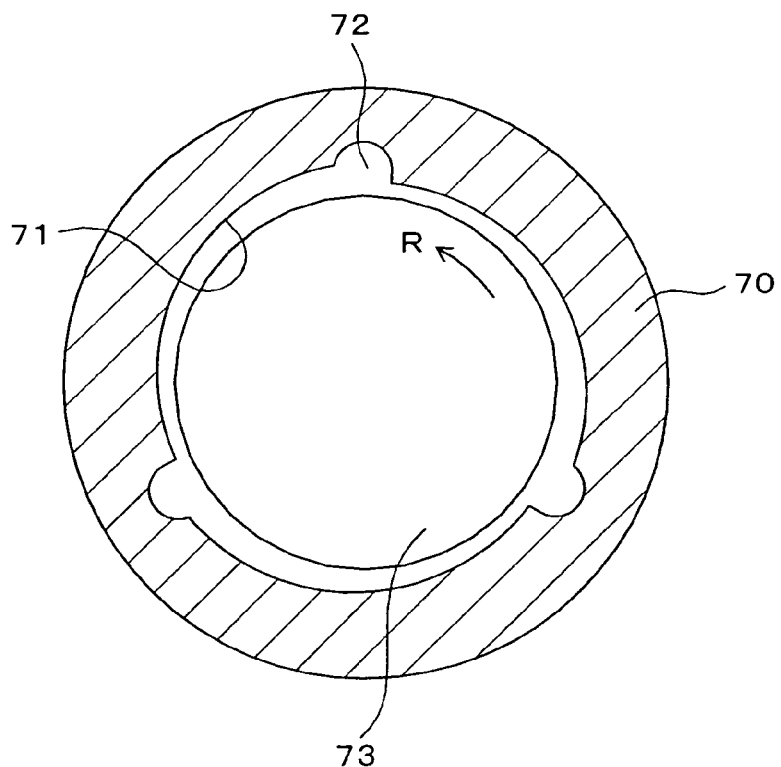
FIG. 3 is a plan view showing an example of a shape of dynamic pressure grooves of a sintered bearing member.
Figure 4:
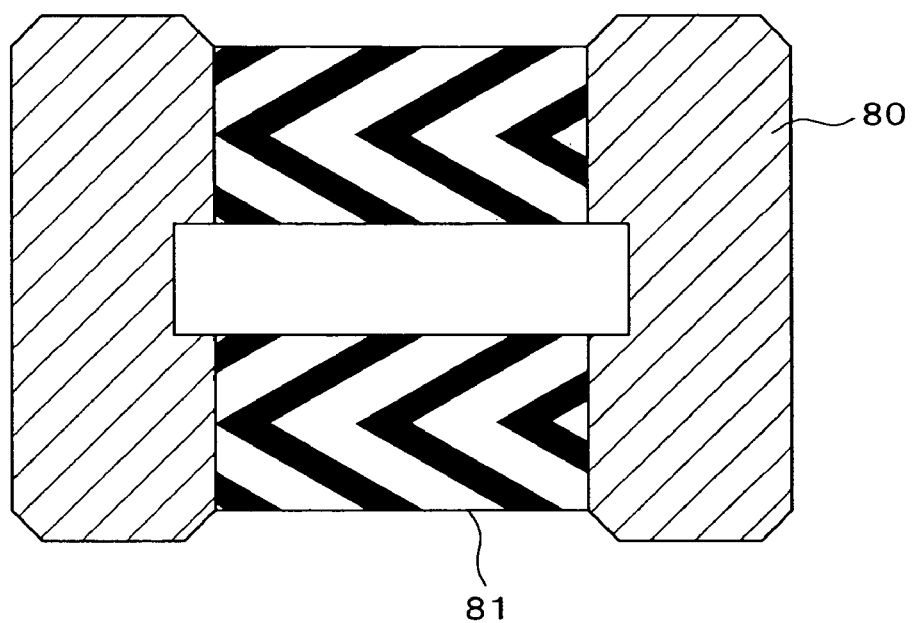
FIG. 4 is a side cross-sectional view showing an example of a shape of dynamic pressure grooves of a sintered bearing member.

FIGS. 3 and 4 show shapes of dynamic pressure grooves of sintered bearing members 70 and 80 which were produced by the above-mentioned production process; FIG. 3 is a plan view and FIG. 4 is a cross-sectional view. FIG. 3 shows the shape of the dynamic pressure grooves of the sintered bearing member 70 having three circular arc grooves. The inner peripheral surface of the sintered bearing member is formed with wedge-shaped grooves 71 for generating dynamic pressure and oil reserving grooves 72 having a semicircular cross section. The surface of the wedge-shaped groove 71 of the sintered bearing member 70 and the outer peripheral surface of a shaft 73 rotating in the sintered bearing member 70 form a wedge-shaped space, in which an oil film is formed and dynamic pressure is generated by the rotation of the rotating shaft 73 in the direction R, and the dynamic pressure precisely supports the rotating shaft 73. The wedge-shaped grooves 71 and the oil reserving grooves 72 are formed by plastic working in the process for forming the bearing surface as mentioned above.

FIG. 4 shows a sintered bearing member 80 having herringbone grooves for generating dynamic pressure. The herringbone grooves 81 are formed on the inner peripheral surface of the sintered bearing member 80 by plastic working as well as the embodiment shown in FIG. 3. A fluid dynamic pressure bearing device using the sintered bearing member 70 or 80 can avoid leakage of dynamic pressure maintaining precise dimensions by the resin impregnation process and the resin removing process explained hereinafter, and spindle motors installed with the fluid dynamic pressure bearing device exhibit superior rotational characteristics.

Figure 5:
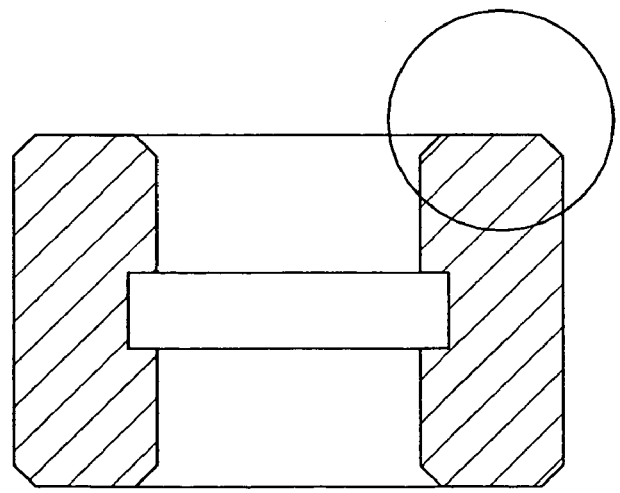
FIG. 5 is an enlarged cross-sectional view of the sintered bearing members 32 and 43 shown in FIGS. 1A, 1B, and FIG. 2.
Figure 6:
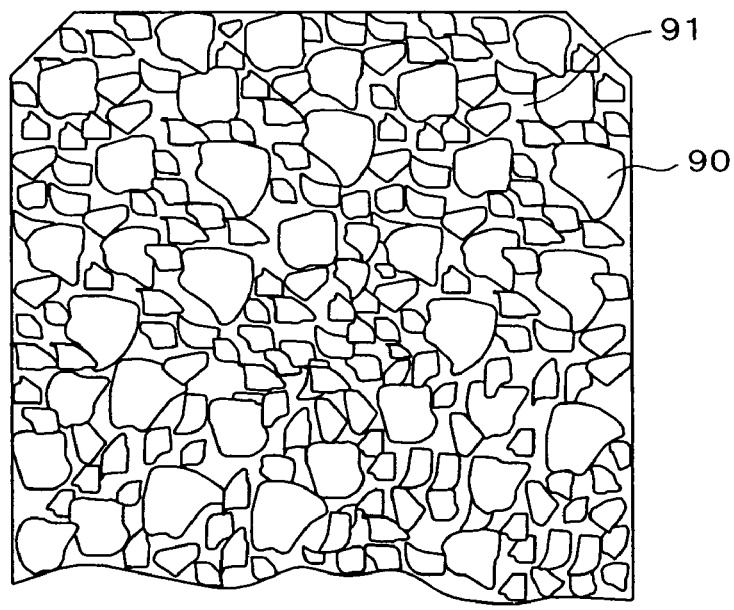
FIG. 6 is a schematic view of a condition of sintering in a portion indicated by a circle in FIG. 5 when it is sintered.
Figure 7:
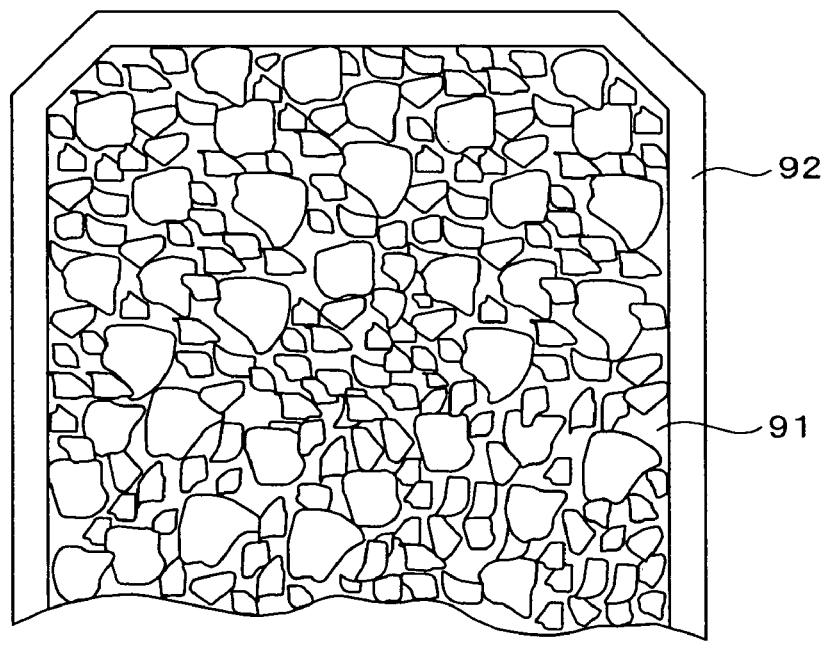
FIG. 7 is a schematic view of a condition of impregnation of a resin in the portion indicated by the circle in FIG. 5.
Figure 8:
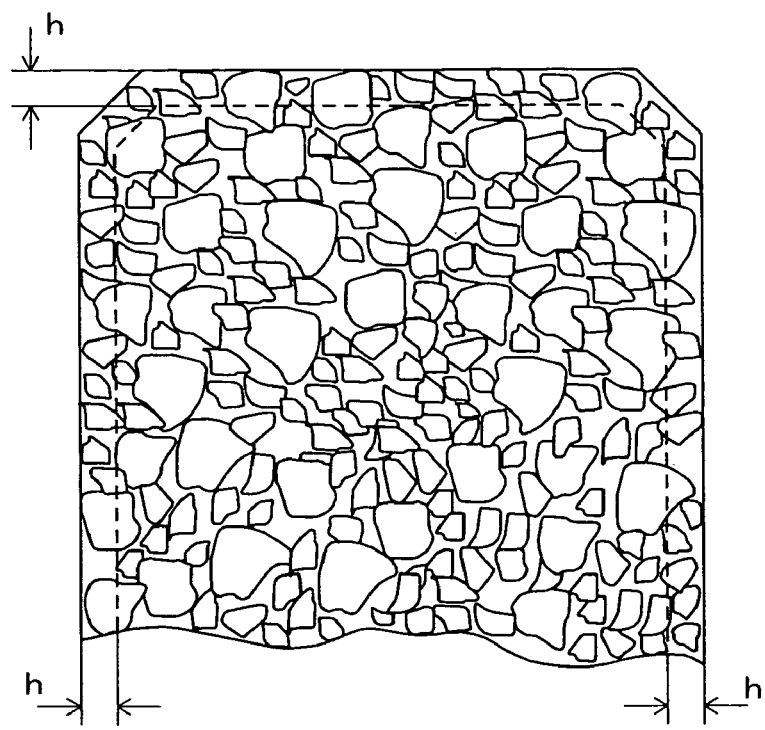
FIG. 8 is a schematic view of a condition in which a resin is removed in the portion indicated by the circle in FIG. 5.

FIG. 5 is an enlarged cross-sectional view of the sintered bearing member 32 or 42 shown in FIG. 1A or 1B. FIGS. 6 to 8 are detailed views of conditions of sintering in an end surface portion indicated by a circle in FIG. 5. The sintered bearing member is produced by the following process.

First, a metal powder 90 is compacted and sintered as shown in FIG. 6 and a porous sintered compact having pores 91 is obtained. Then, the sintered compact 90 is impregnated with a water soluble resin solvent by the process mentioned above, whereby the sintered compact 90 is in the condition shown in FIG. 7. In this condition, a water soluble resin solvent is impregnated into the pores 91 and forms a resin solvent layer 92 on the surface of the sintered compact 90 with a thickness of about 10 µm. Arbitrary amount of the resin solvent layer 92 thus adhered to the surface is removed by providing a water stream before the resin is hardened. As shown in FIG. 8, the washing time is determined according to the depth h (surface layer indicated by a dotted line) over which the resin solvent is removed.

When the sintered bearing member having multiple circular arc grooves such as three circular arc grooves as shown in FIG. 3 and the sintered bearing member having herringbone grooves as shown in FIG. 4 are produced, the depth of the dynamic pressure grooves formed on the inner peripheral surface of the sintered compact is a few micrometers to about 10 µm. Therefore, sufficient depth over which the resin solvent is removed may be about 0.1 mm.

It should be noted that the sintered compact may be subjected to a machining process to improve coaxial precision of the inner and outer peripheral surfaces and perpendicularity precision of the end surface since there is a limit to improvement of precision of the sintered compact by repressing (sizing). In this case, the machining depth may be merely up to several tens of micrometers. Therefore, even if the sintered compact is machined, a surface without resin can be obtained, the wedge-shaped grooves 71 and the oil reserving grooves 72 as shown in FIG. 3 and the herringbone grooves as shown in FIG. 4 can be easily formed.

Figure 9:
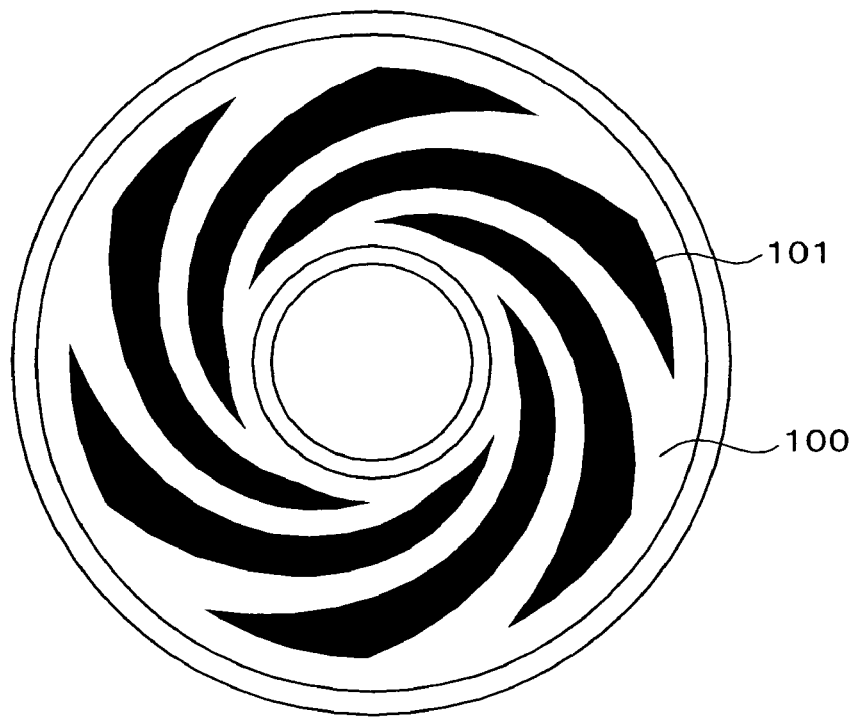
FIG. 9 is a plan view of an example of a thrust sintered bearing member.
Figure 10:
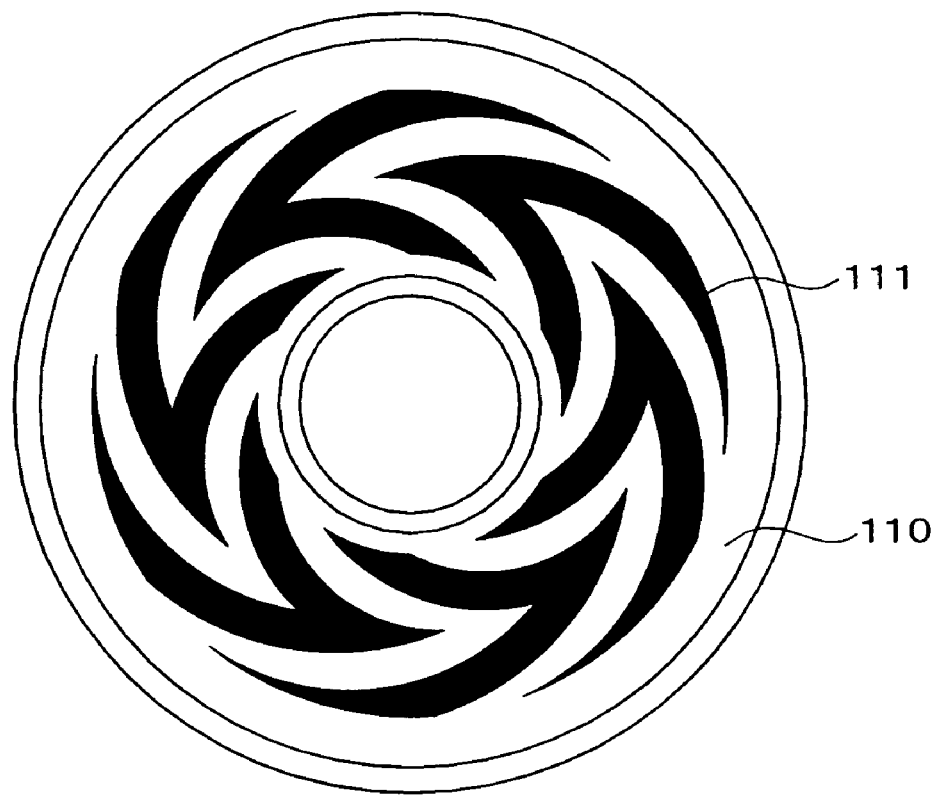
FIG. 10 is a plan view of another example of a thrust sintered bearing member.

The above-described sintered bearing member is a radial sintered bearing member, and a thrust sintered bearing member will be explained in detail hereinafter. FIGS. 9 and 10 are plan views showing embodiments of thrust sintered bearing members. In these thrust sintered bearing members, spiral dynamic pressure grooves 101 or herringbone grooves 111 for generating dynamic pressure are formed on an end surface 100 or 110 of an end plate. These spiral dynamic pressure grooves 101 and herringbone grooves 111 are formed such that a resin solvent is impregnated in the same way as in the production method of the above radial sintered bearing member; the resin solvent adhering to the surface is removed; and an embossing die having protrusions corresponding to the dynamic pressure grooves is pressed to the end surface 100 or 110, thereby plastic working the grooves. The grooves are precisely formed since the resin does not exist on the end surface 100 or 110 as well as the inner peripheral surface of the radial sintered bearing member.

Thrust bearing members such as in FIGS. 9 and 10 have been made from ingot steels such as stainless steels. In the sintered bearing members impregnating the resin according to the invention, the pores are sealed and oil leakage is avoided as mentioned above, whereby the sintered bearing members exhibit the same performance as that of the conventional thrust bearing members made from ingot steels. Furthermore, the spiral grooves and the herringbone grooves can be easily formed by plastic working, whereby high dimensional precision is maintained.

The above embodiments show the process in which the resin solvent is impregnated into the sintered compact; the resin solvent adhering to the surface of the sintered compact is removed to expose the matrix as sintered on a surface of the sintered compact; and the dynamic pressure grooves such as the multiple circular arc grooves and spiral grooves are formed on the bearing surface. It should be noted that the invention includes the process in which resin impregnation, water washing, and resin hardening may be performed after repressing and bearing surface forming in which the dynamic pressure grooves such as the multiple circular arc grooves and spiral grooves are formed in FIG. 2. Such a process can yield the same advantages as the above process since the surface layer of the sintered compact is a matrix as sintered.

What is claimed is:

1. A production method for a sintered bearing member, the method comprising:
    compacting a metal powder into a green compact;
    sintering the green compact into a sintered compact;
    impregnating a water soluble resin solvent into the sintered compact; and
    removing the resin solvent adhering to a surface of the sintered compact, thereby exposing a matrix as sintered on a surface of the sintered compact;
    wherein pores existing in portions other than the surface of the sintered compact are sealed with the resin.

2. The production method for a sintered bearing member according to claim 1, wherein the surface of the sintered compact is washed by water and the resin solvent adhering to the surface is removed before the resin is hardened.

3. The production method for a sintered bearing member according to claim 2, wherein the resin solvent existing in an area from the surface of the sintered compact to a depth of approximately 0.1 to 0.2 mm is removed by the washing.

4. The production method for a sintered bearing member according to claim 1, wherein the sintered compact is heated at a temperature of 80 to 90° C., thereby hardening the resin in the pores after removing the resin solvent adhering to the surface of the sintered compact.

5. The production method for a sintered bearing member according to claim 4, wherein dynamic pressure grooves are formed after the resin is hardened.

6. The production method for a sintered bearing member according to claim 1, wherein dynamic pressure grooves are formed before the water soluble resin solvent is impregnated into the sintered compact.

* * * * *

UNITED STATES PATENT AND TRADEMARK OFFICE
CERTIFICATE OF CORRECTION

| | | |
|---|---|---|
| PATENT NO. | : 7,251,891 B2 | Page 1 of 1 |
| APPLICATION NO. | : 11/137134 | |
| DATED | : August 7, 2007 | |
| INVENTOR(S) | : Katsutoshi Nii et al. | |

It is certified that error appears in the above-identified patent and that said Letters Patent is hereby corrected as shown below:

On the Title Page

Item (30), before item (51), insert new item:
        --Foreign Application Priority Data May 24, 2004      (JP)      2004-152917--.

In the Claims

Column 8, in claim 4, line 3, after "80 to 90°" delete "C.," and substitute --C,-- in its place.

Signed and Sealed this

Fourth Day of December, 2007

JON W. DUDAS
*Director of the United States Patent and Trademark Office*